(12) United States Patent
Butler

(10) Patent No.: US 6,518,829 B2
(45) Date of Patent: Feb. 11, 2003

(54) DRIVER TIMING AND CIRCUIT TECHNIQUE FOR A LOW NOISE CHARGE PUMP CIRCUIT

(75) Inventor: Douglas Blaine Butler, Colorado Springs, CO (US)

(73) Assignees: United Memories, Inc., Colorado Springs, CO (US); Sony Corporation, Tokyo (JP)

( * ) Notice: Subject to any disclaimer, the term of this patent is extended or adjusted under 35 U.S.C. 154(b) by 56 days.

(21) Appl. No.: 09/730,207

(22) Filed: Dec. 4, 2000

(65) Prior Publication Data

US 2002/0067201 A1 Jun. 6, 2002

(51) Int. Cl.[7] .................................................. G05F 1/10
(52) U.S. Cl. .......................................... 327/536; 363/60
(58) Field of Search ........................... 327/536; 307/110; 363/59, 60

(56) References Cited

U.S. PATENT DOCUMENTS

| | | | | |
|---|---|---|---|---|
| 5,703,511 A | * | 12/1997 | Okamoto | 327/536 |
| 5,801,578 A | * | 9/1998 | Bereza | 327/536 |
| 6,008,690 A | * | 12/1999 | Takeshima et al. | 327/536 |
| 6,018,264 A | * | 1/2000 | Jin | 327/536 |
| 6,097,161 A | * | 8/2000 | Takano et al. | 327/536 |
| 6,107,862 A | * | 8/2000 | Mukainakano et al. | 327/536 |
| 6,147,519 A | * | 11/2000 | Krynski | 327/536 |
| 6,198,340 B1 | * | 3/2001 | Ting et al. | 327/536 |

* cited by examiner

Primary Examiner—Kenneth B. Wells
(74) Attorney, Agent, or Firm—William J. Kubida; Peter J. Meza; Hogan & Hartson LLP

(57) ABSTRACT

A driver timing and circuit technique for a low noise charge pump circuit of particular applicability with respect to integrated circuit devices requiring voltage levels either more positive than or more negative than, externally supplied voltages. In accordance with the technique of the present invention, the pump capacitor is driven "high" by one transistor and "low" by another. By correctly sizing the devices driving them, each transistor can be turned "off" quickly and "on" slowly and, in an alternative embodiment, both transistors may be "off" at the same time resulting in "tri-state" operation. Timing is set such that both transistors are "off" when a third transistor connecting the intermediate node to the power supply is turned "on" and when a fourth transistor connecting the intermediate node to the pumped supply is turned "on" thereby preventing large dI/dt and resultant noise on the power supply sources.

24 Claims, 8 Drawing Sheets

DRIVER TIMING AND CIRCUIT TECHNIQUE FOR A LOW NOISE CHARGE PUMP CIRCUIT

BACKGROUND OF THE INVENTION

The present invention relates, in general, to the field of integrated circuit ("IC") devices. More particularly, the present invention relates to a driver timing and circuit technique for a low noise charge pump circuit of particular applicability with respect to IC devices requiring voltage levels either in excess of, or lower than, externally supplied voltages.

IC devices are typically designed to require only a power ("VCC") and a relative circuit ground ("VSS") voltage supplies. This increases the ease of use of the IC device in a system. Nevertheless, in some cases subcircuits of these devices require voltage supply levels above or below these levels for proper operation.

Current dynamic random access memory ("DRAM") devices frequently require a voltage supply level above VCC to drive the memory access transistor gate or row decoder logic to sufficiently high levels such that a full VCC level can be written into the memory cell. DRAMs also frequently require a voltage level below VSS which is used to bias the substrate to prevent minority carrier injection from peripheral circuits. In addition, electrically erasable programmable read-only memory devices ("EEPROMs") frequently require a voltage supply level higher than VCC in order to program or erase memory cells.

In this regard, voltage levels higher than VCC are often generated on the IC device itself (i.e. "on-chip" by means of charge pump circuits. A charge pump circuit utilized to derive a voltage above the level of VCC generally operates by connecting a first node of a capacitor to VCC while the second node is connected to VSS; disconnecting the first node of the capacitor from VCC and connecting it to a pumped node ("VCCP"); disconnecting the second node of the capacitor from VSS and driving it to VCC thereby driving the first node above VCC and coupling the first node of the capacitor to the pumped node transferring charge to it; disconnecting the first node of the capacitor from the pumped node and reconnecting it to VCC; disconnecting the second node from VCC and connecting again to VSS thereby restoring the initial state of the capacitor and repeating the steps resulting in charge being "pumped" from VCC to VCCP.

In those applications wherein VCCP is required to provide relatively large amounts of current, the capacitor and transistors in the charge pump must also be large in size. When the transistors switch "on" and "off" to drive the capacitor nodes "high" or "low", large amounts of current flow and the rate of change of the current ("dI/dt") flow is also large. Because the voltage supplies VCC and VSS are sourcing and sinking this current, the VCC and VSS voltage levels vary as a result of the charge pump operation. This voltage variation constitutes undesired "noise" and this noise on the VSS and VCC supplies can cause an IC device to fail to function properly in a system. The amount of noise is determined by the resistance and inductance of the VCC and VSS supplies, and for IC devices, the most difficult source of noise to control is that due to the dI/dt factor because the die bond wires present significant levels of inductance.

In conventional charge pump circuits, the pump capacitor is driven by an inverter causing a relatively large change in current over time ("dI/dt") to occur when the capacitor node is driven and when the transistor connecting the intermediate node to the power supply is turned "on". A similar dI/dt also occurs when the transistor connecting the intermediate node to the pumped node is turned "on". These dI/dt changes at the capacitor and intermediate nodes result in undesired and sometimes unacceptable noise in the circuit.

SUMMARY OF THE INVENTION

In accordance with the technique of the present invention, the pump capacitor of a driver circuit for an integrated circuit device is driven "high" by one transistor and "low" by another. By correctly sizing the devices driving them, each transistor can be turned "off" quickly and "on" slowly and, in an alternative embodiment, both transistors may be "off" at the same time resulting in "tri-state" operation. Timing may be set such that both transistors are "off" when the transistor connecting the intermediate node to the power supply is turned "on" thereby preventing a large dI/dt and resultant noise on the power supply sources.

Particularly disclosed herein is an integrated circuit device including a charge pump circuit which comprises a capacitive element having first and second terminals coupled to an intermediate and capacitor 62 nodes respectively. A first switching device is 52 provided for selectively coupling the intermediate node to a supply voltage line in response to a first clocking signal together with a second switching 54 device for selectively coupling the intermediate node to a pumped voltage line in response to a second clocking signal. A first inverter 66 has an input coupled to receive a third clocking signal and an output coupled to a third switching device 58 for selectively coupling the capacitor node to the supply voltage line in response to the third clocking signal; and a second inverter 72 has an input coupled to also receive the third clocking signal and an output coupled to a fourth switching device 60 for selectively coupling the capacitor node to a ground voltage line in response to the same third clocking signal. In an alternative "tri-state" embodiment, the second inverter has its input coupled to receive a separate fourth clocking signal and is operative to cause the fourth switching device to couple the capacitor node to the ground voltage line in response thereto independently of the third clocking signal.

Also particularly disclosed herein is a method for operating a charge pump in an integrated circuit device which comprises the steps of coupling a first terminal of a capacitive element to a supply voltage line while a second terminal of the capacitive element is coupled to a ground voltage line. The first terminal is firstly decoupled from the supply voltage line while substantially concurrently coupling the first terminal to a pumped voltage line. The second terminal is secondly decoupled from the ground voltage line while substantially concurrently coupling the second terminal to the supply voltage line. The first terminal is thirdly decoupled from the pumped voltage line while substantially concurrently coupling the first terminal to the supply voltage line. The second terminal is then fourthly decoupled from the supply voltage line while substantially concurrently coupling the second terminal to the ground voltage line. In operation, the step of secondly decoupling the second terminal from the ground voltage line occurs relatively more quickly than the corresponding step of substantially concurrently coupling the second terminal to the supply voltage line. Also, the step of fourthly decoupling the second terminal from the supply voltage line may also occur relatively more quickly than the corresponding step of substantially concurrently coupling the second terminal to the ground voltage line.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A REPRESENTATIVE EMBODIMENT

Figures 1, 2:
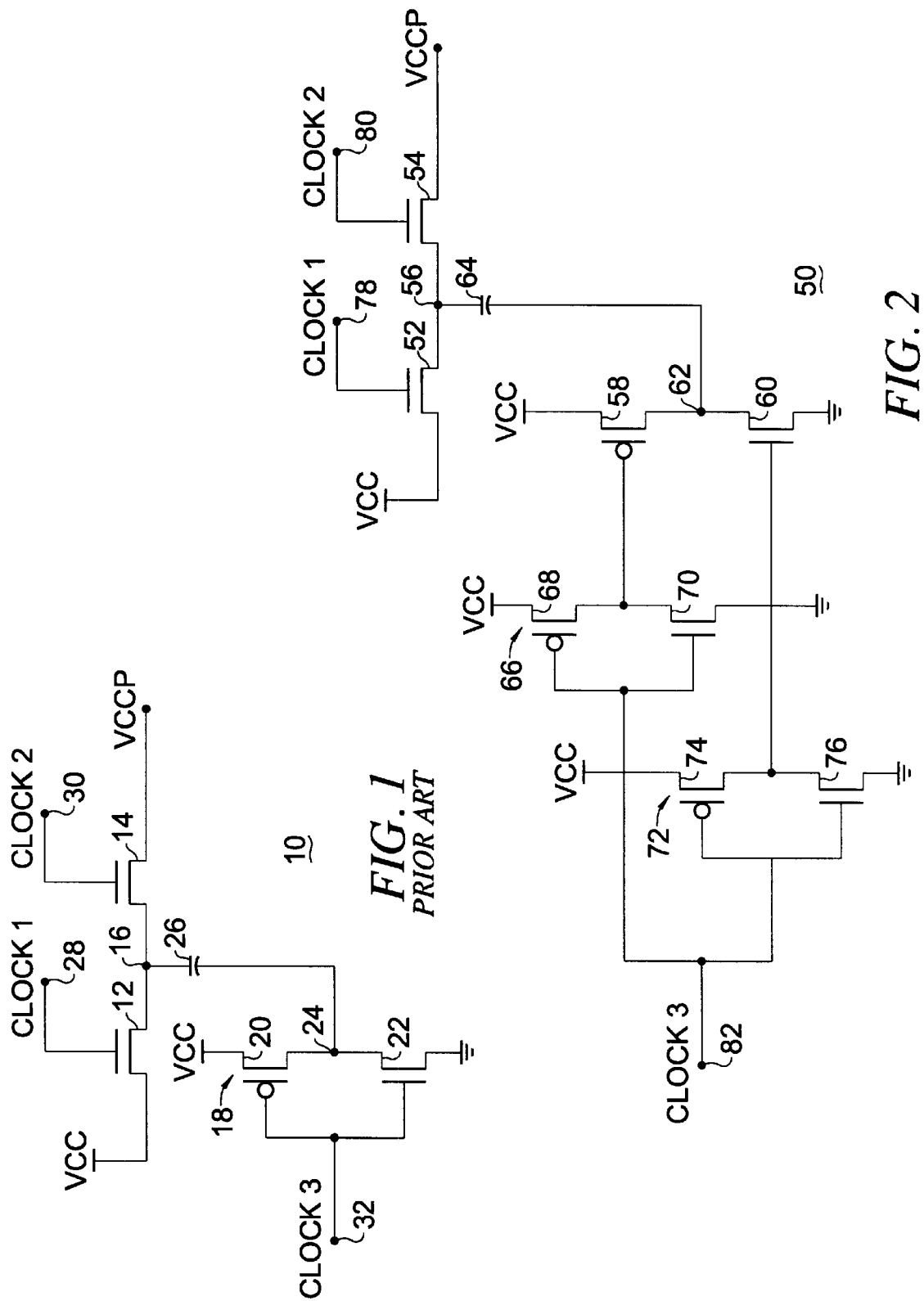
FIG. 1 is a schematic diagram of a conventional charge pump circuit utilizing a CMOS inverter activated by a clock signal ("CLOCK3") to drive a first capacitor terminal and having an opposite second terminal coupled to a node intermediate a series string of transistors for selectively coupling the intermediate node to either VCC or VCCP depending on the clock signals ("CLOCK1" and "CLOCK2") applied to their respective gates.
FIG. 2 is a schematic diagram of an embodiment of a "fast-off/slow-on" charge pump circuit in accordance with the present invention wherein the capacitor may be driven "high" by one transistor and "low" by another transistor as controlled by a corresponding pair of CMOS inverters having their inputs common coupled to the receive the CLOCK3 signal.

With reference now to FIG. 1, a conventional charge pump circuit 10 is shown. The conventional charge pump circuit 10 comprises a first N-channel transistor 12 for coupling an intermediate node 16 to a supply voltage source ("VCC") and a second N-channel transistor 14 for coupling the intermediate node 16 to a pumped supply voltage source ("VCCP").

A CMOS inverter 18 comprising series connected P-channel transistor 20 and N-channel transistor 22 is coupled between VCC and circuit ground ("VSS"). The output of the inverter 18 defines a capacitor node 24 which is coupled to a first terminal (or node) of a capacitor 26 which has its second terminal coupled to the intermediate node 16. A clock signal ("CLOCK1") on line 28 is furnished to the gate of transistor 12 while another clock signal ("CLOCK2") on line 30 is furnished to the gate of transistor 14. Another clock signal ("CLOCK3") on line 32 is furnished to the input of the inverter 18.

In the embodiment of the charge pump circuit 10 illustrated, transistors 12, 14 and 22 may have a channel width of $1000\mu$ and a length of $0.34\mu$, with transistor 20 having a width of $2000\mu$ and a corresponding length of $0.34\mu$ as well. The capacitor 26 may have a typical value of substantially 300 pf.

With reference additionally now to FIG. 2, a charge pump circuit 50 in accordance with one embodiment of the present invention is shown. The charge pump circuit 50 comprises a first N-channel transistor 52 for coupling an intermediate node 56 to VCC and a second N-channel transistor 54 for coupling the intermediate node 16 to the pumped supply voltage source VCCP.

Series connected P-channel transistor 58 and N-channel transistor 60 are coupled between VCC and VSS. A capacitor node 62 is defined between transistors 58 and 60 and is coupled to a first terminal (or node) of a capacitor 64 which has its second terminal coupled to the intermediate node 56.

A first CMOS inverter 66 comprising series connected P-channel transistor 68 and N-channel transistor 70 is coupled between VCC and VSS and has its output coupled to the gate terminal of transistor 58. Similarly, a second CMOS inverter 72 comprising series connected P-channel transistor 74 and N-channel transistor 76 is also coupled between VCC and VSS and has its output coupled to the gate terminal of transistor 60. The inputs of the first and second inverters 66, 72 are coupled to a common input line 82 which receives a CLOCK3 input signal. The CLOCK1 signal on line 78 is furnished to the gate of transistor 52 while the CLOCK2 signal on line 80 is furnished to the gate of transistor 54.

Figure 3:
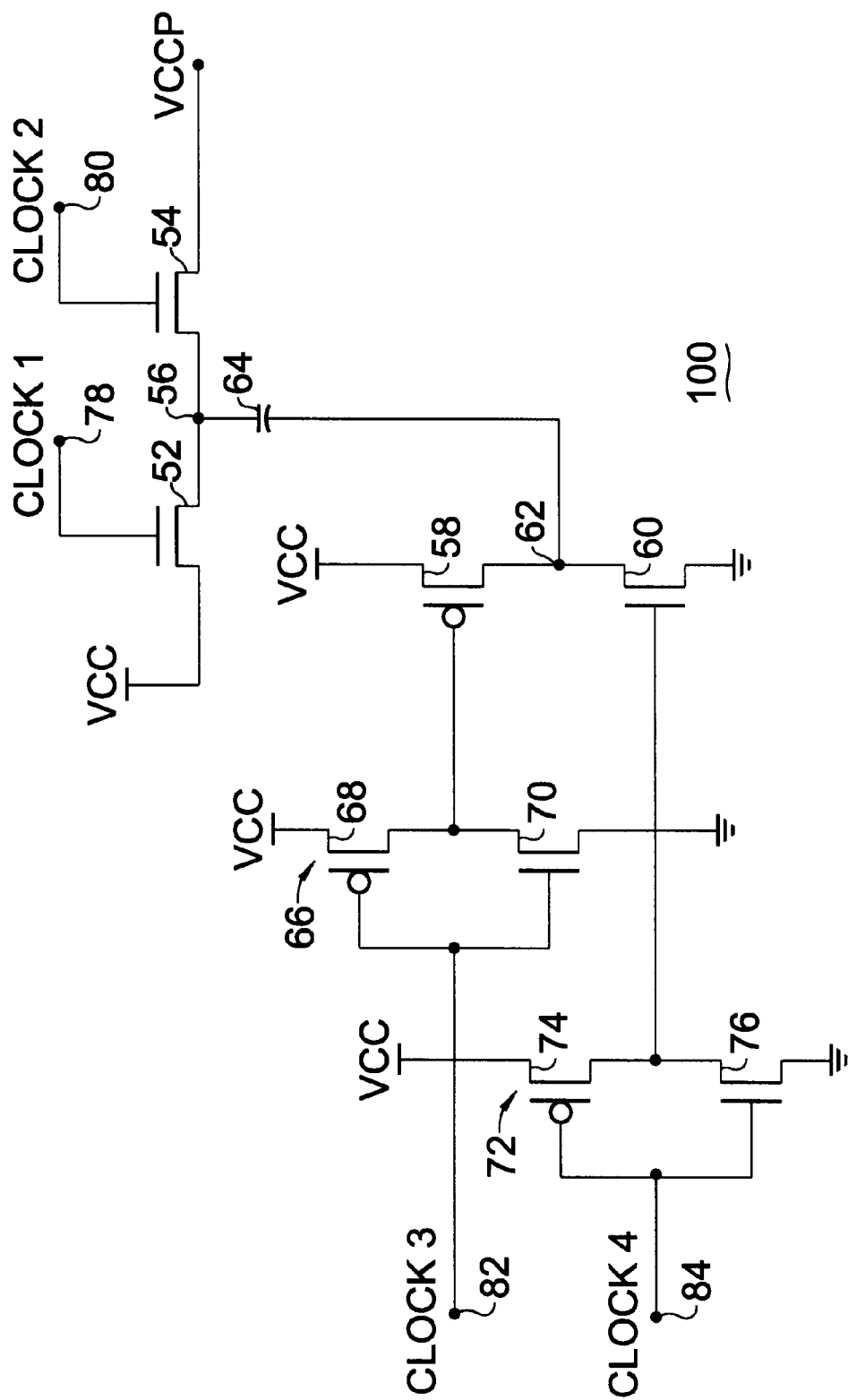
FIG. 3 is a schematic diagram of an alternative "tri-state" embodiment of a charge pump circuit in accordance with the present invention wherein each of the CMOS inverters illustrated in the preceding figure in this instance respectively receive a separate CLOCK3 and CLOCK4 input signal.

With reference additionally now to FIG. 3, an alternative embodiment of a charge pump circuit 100 in accordance with the present invention is shown. As previously disclosed with respect to the charge pump circuit 50 of FIG. 2, the charge pump circuit 100 comprises a first N-channel transistor 52 for coupling an intermediate node 56 to VCC and a second N-channel transistor 54 for coupling the intermediate node 16 to the pumped supply voltage source VCCP.

As before, series connected P-channel transistor 58 and N-channel transistor 60 are coupled between VCC and VSS. A capacitor node 62 is defined between transistors 58 and 60 and is coupled to a first terminal (or node) of a capacitor 64 which has its second terminal coupled to the intermediate node 56.

A first CMOS inverter 66 comprising series connected P-channel transistor 68 and N-channel transistor 70 is coupled between VCC and VSS and has its output coupled to the gate terminal of transistor 58. Similarly, a second CMOS inverter 72 comprising series connected P-channel transistor 74 and N-channel transistor 76 is also coupled between VCC and VSS and has its output coupled to the gate terminal of transistor 60.

With respect to the embodiment of the charge pump circuit 100, the inputs of the first and second inverters 66, 72 are herein not coupled to a common input line for receiving the CLOCK3 input signal. Rather, the input of the inverter 66 is coupled to an input line 82 for receiving the CLOCK3 signals while the input of the inverter 72 is separately coupled to another input line 84 for receiving a CLOCK4 signal. As before, however, the CLOCK1 signal on line 78 is furnished to the gate of transistor 52 while the CLOCK2 signal on line 80 is furnished to the gate of transistor 54.

With respect to the embodiments of the charge pump circuit 50 (FIG. 2) and the charge pump circuit 100 (FIG. 3), transistors 52, 54 and 60 may also have a channel width of 1000μ and a length of 0.34μ, with transistor 58 having a width of 2000μ and a corresponding length of 0.34μ as well. The capacitor 64 may have a typical value of substantially 300 pf. Transistors 70, 74 may have a channel width of 10μ and a length of 0.34μ while transistor 68 has a width of 400μ and transistor 76 has a width of 100μ, both having a channel length of 0.34μ. As can be seen, transistor 68 is larger than transistor 74 while transistor 76 is larger than transistor 70. This relative device sizing facilitates the "fast-off/slow-on" operation of the charge pump circuits 50 (FIG. 2) and 100 (FIG. 3) which will be described in more detail hereinafter.

Figure 4:
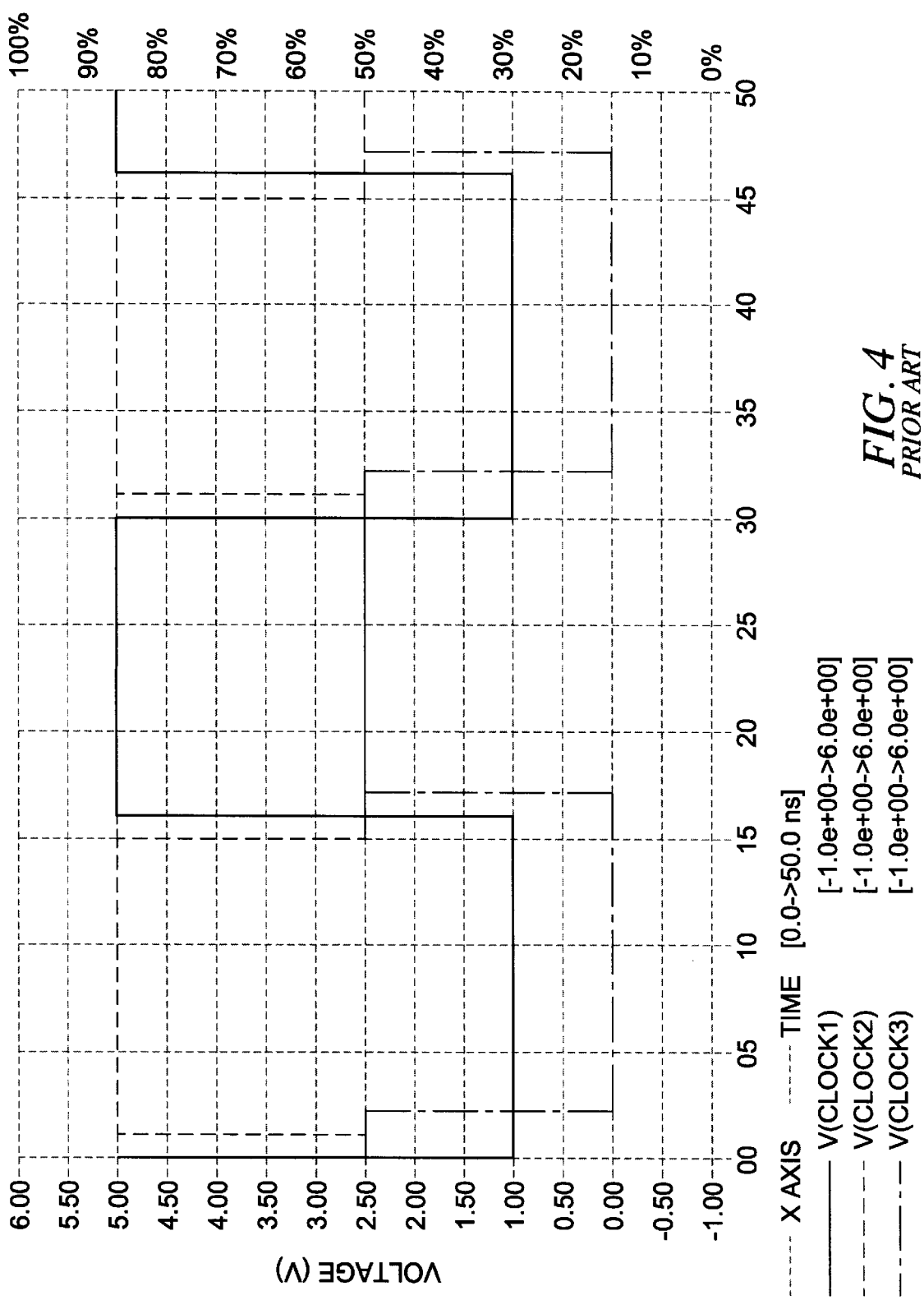
FIG. 4 is a timing diagram of the CLOCK1, CLOCK2 and CLOCK3 signal inputs to the conventional charge pump circuit of FIG. 1.

With reference additionally now to FIG. 4, a timing diagram of the CLOCK1, CLOCK2 and CLOCK3 signal inputs to the conventional charge pump circuit 10 of FIG. 1 is shown. In operation, the various clock signals function to couple the capacitor node 24 to VSS through the operation of transistor 22 in response to the CLOCK3 signal while transistor 12 couples the intermediate node 16 to VCC in response to the CLOCK1 signal. Transistor 12 is then turned "off" in response to CLOCK1. At this point, the capacitor node 24 is then decoupled from VSS by turning off transistor 22 and turning on transistor 24 in response to the CLOCK3 signal to couple the capacitor node 24 to VCC. This drives the voltage on the intermediate node 16 above VCC. Transistor 14 is then turned "on" in response to the CLOCK2 signal to connect the intermediate node 16 to VCCP and charge is transferred to VCCP. The intemediate node 16 is then disconnected from VCCP by turning "off" transistor 14 in response to the CLOCK2 signal. The capacitor node 24 is then disconnected from VCC and connected to VSS by turning "off" transistor 20 and turning "on" transistor 22 in response to the CLOCK3 signal. Transistor 12 is then turned on in response to the CLOCK1 signal coupling the intermediate node 16 to VCC thereby restoring the state of the capacitor 26. Repeating the foregoing steps results in charge being "pumped" from a level of VCC to the higher voltage supply VCCP.

Figure 5:
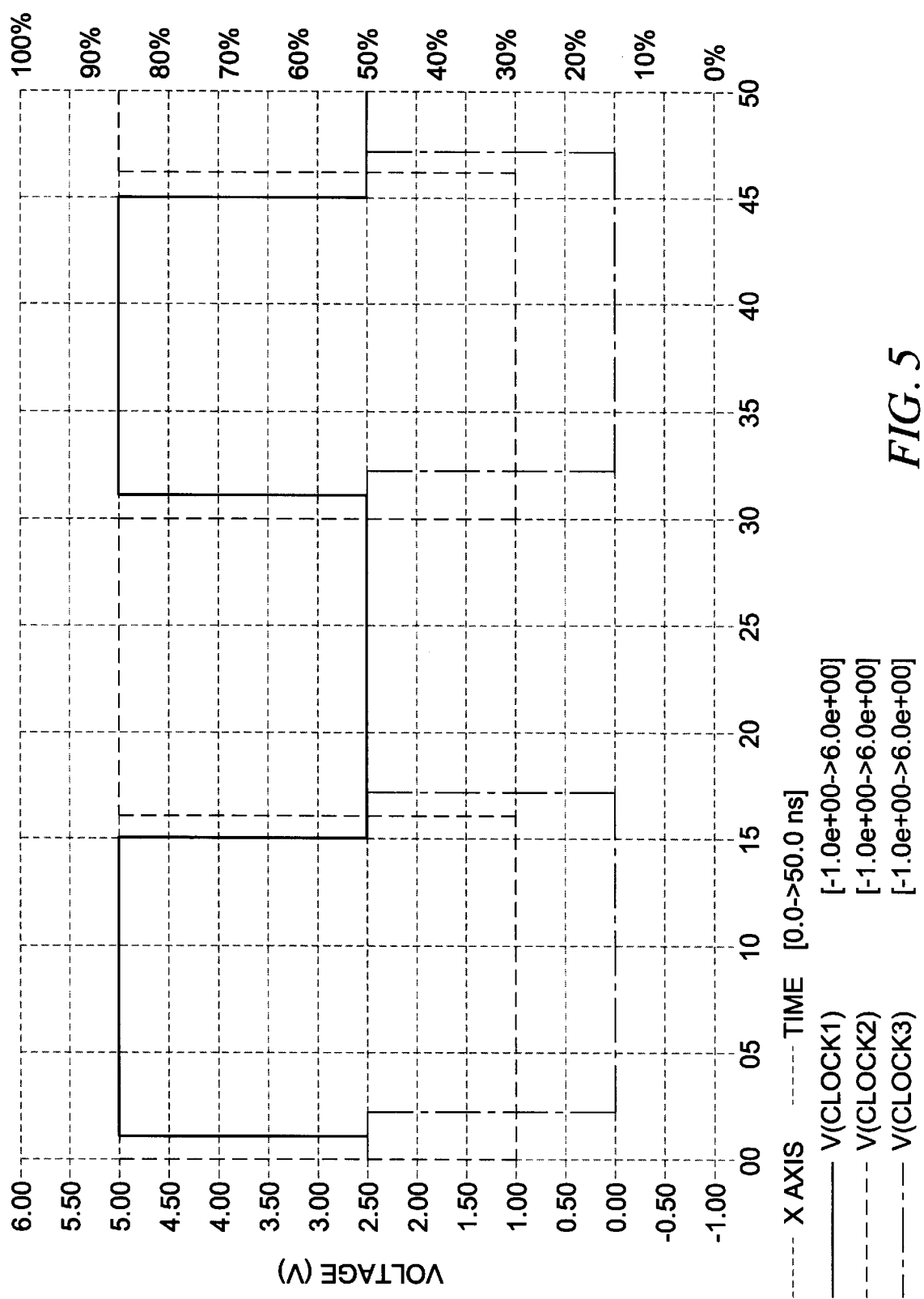
FIG. 5 is a corresponding timing diagram of the CLOCK1, CLOCK2 and CLOCK3 signal inputs to the "fast-off/slow-on" charge pump circuit of FIG. 2 in accordance with that particular embodiment of the present invention.

With reference additionally now to FIG. 5, a corresponding timing diagram of the CLOCK1, CLOCK2 and CLOCK3 signal inputs to the charge pump circuit 50 of FIG. 2 is shown. As previously described, the various clock signals function to couple the capacitor node 62 to VSS through the operation of transistor 60 in response to the CLOCK3 signal applied through inverter 72 while transistor 52 couples the intermediate node 56 to VCC in response to the CLOCK1 signal. Transistor 52 is then turned "off" in response to CLOCK1 signal. At this point, the capacitor node 62 is then decoupled from VSS by turning off transistor 60 and turning on transistor 58 in response to the CLOCK3 signal coupled through inverters 72 and 66 respectively to couple the capacitor node 62 to VCC. This drives the voltage on the intermediate node 56 above VCC. Transistor 54 is then turned "on" in response to the CLOCK2 signal to connect the intermediate node 56 to VCCP and charge is transferred to VCCP. The intemediate node 56 is then disconnected from VCCP by turning "off" transistor 54 in response to the CLOCK2 signal. The capacitor node 62 is then disconnected from VCC and connected to VSS by turning "off" transistor 58 and turning "on" transistor 60 in response to the CLOCK3 signal and inverters 66 and 72 respectively. Transistor 52 is then turned on in response to the CLOCK1 signal coupling the intermediate node 56 to VCC thereby restoring the state of the capacitor 64. Repeating the foregoing steps results in charge being "pumped" from a level of VCC to the higher voltage supply VCCP.

Figure 6:
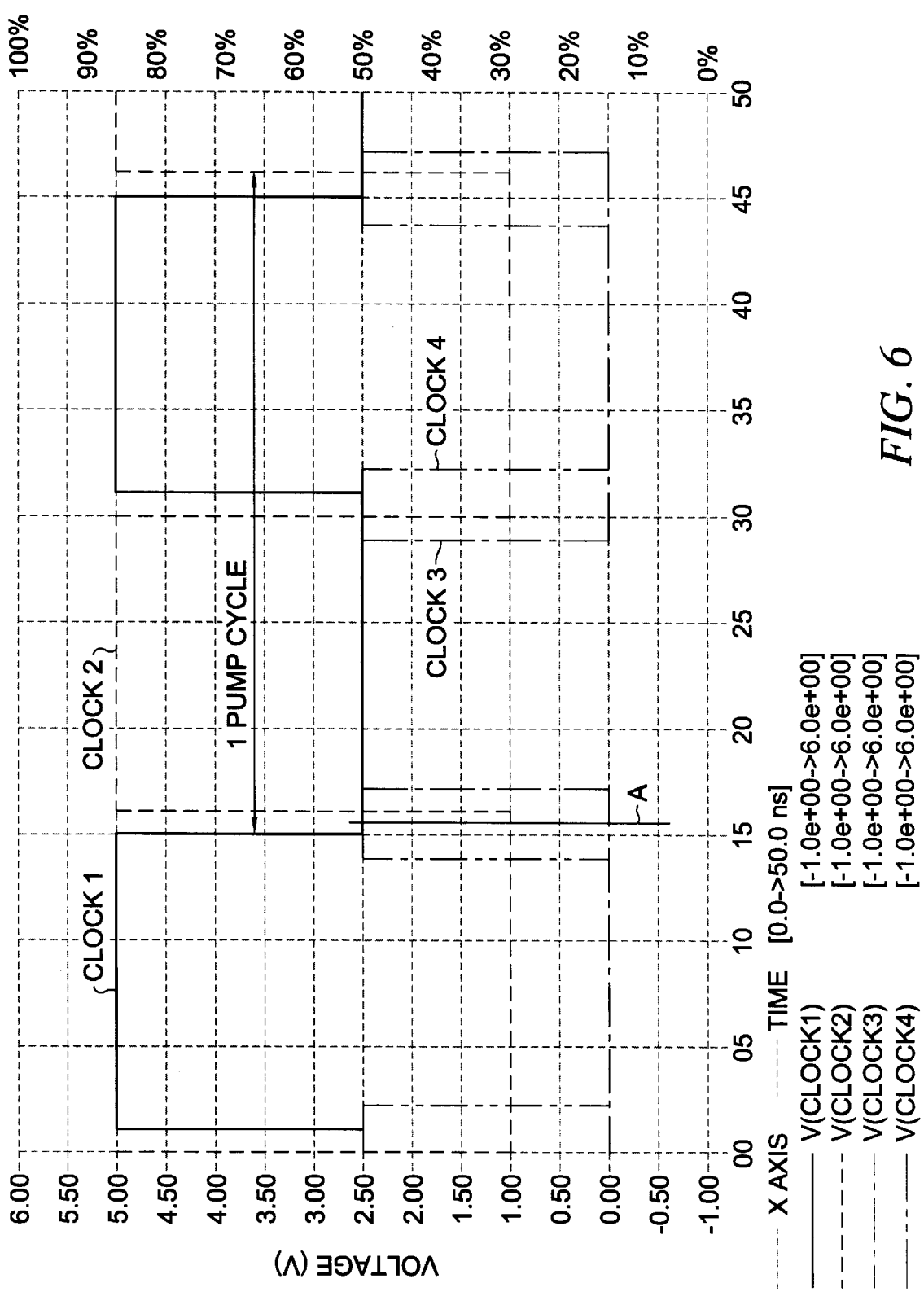
FIG. 6 is a similar corresponding timing diagram of the CLOCK1, CLOCK2, CLOCK3 and CLOCK4 signal inputs to the "tri-state" charge pump circuit of FIG. 3 in accordance with that alternative embodiment of the present invention.
Figure 9:
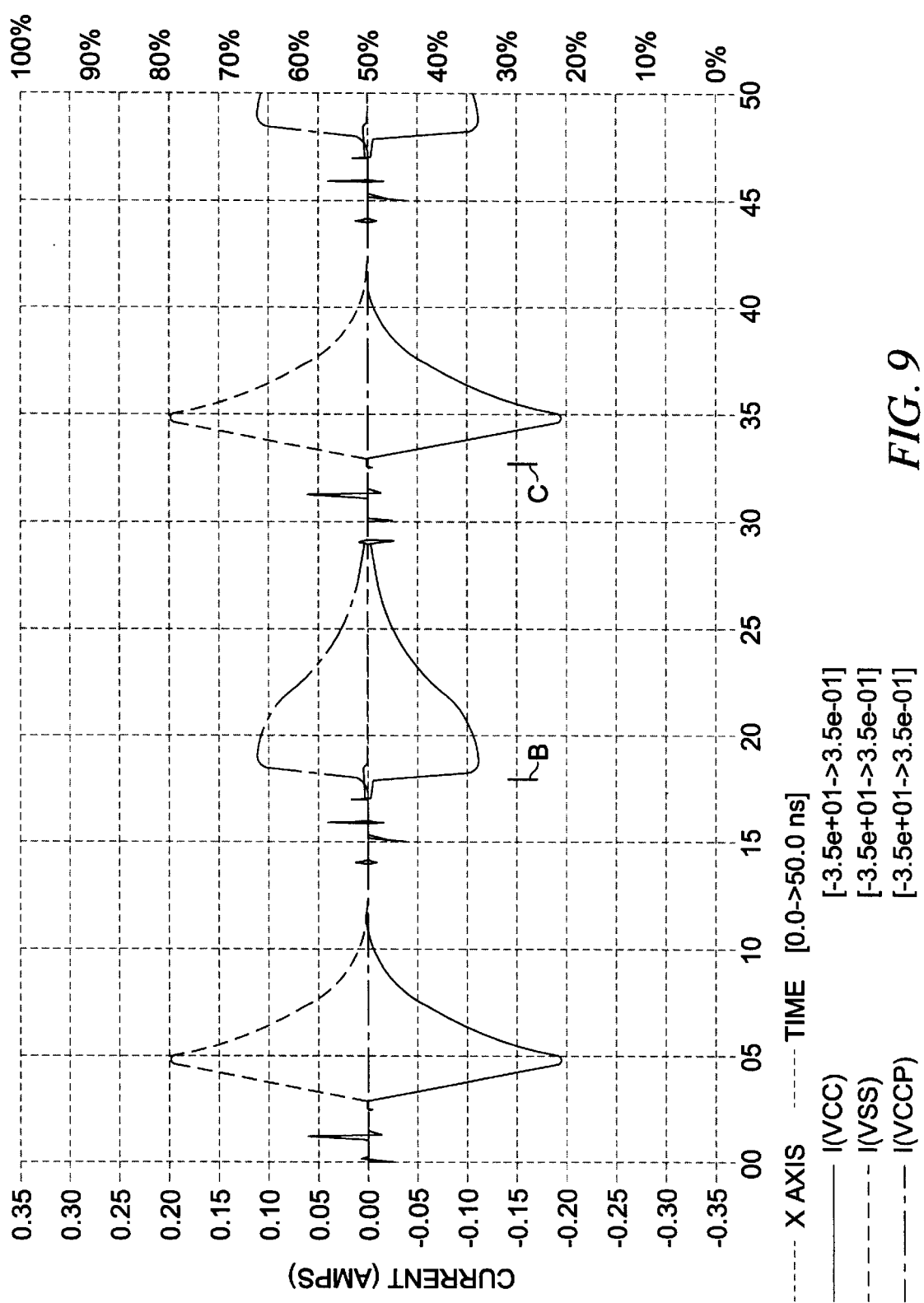
FIG. 9 is a similar timing diagram illustrative of the current flow on the VCC, VSS and VCCP sources for the alternative "tri-state" embodiment of the charge pump circuit shown in FIG. 3 and also particularly pointing out the relative decrease in the slope (dI/dt) of the current spikes generated by its operation as depicted in FIG. 6 when compared to the conventional charge pump circuit of FIG. 1.

With reference additionally now to FIG. 6, the operation of the alternative embodiment of the charge pump circuit 100 of FIG. 3 is shown. At time A in FIG. 6, Transistor 58, 60, 52, and 54 are all in the "off" state. CLOCK2 then goes high connecting node 56 to VCCP. Since node 62 is "tristate" (i.e. not held either VCC or VSS) little charge is required to bring 56 to the same potential as VCCP therefore little noise results. CLOCK3 then goes high causing the output of inverter 66 to go low. Transistor 70 of inverter 66 is sized (small) to slowly pull the gate of transistor 58 low causing 62 to be pulled slowly to VCC causing charge to be transferred from 56 through transistor 54 to VCCP. The slow dV/dt of 62 results in lowered dI/dt as shown at time B in FIG. 9. CLOCK3 then goes low causing the gate of transistor 58 to go high shutting transistor 58 off. This transistor is fast but little dI/dt is seen in FIG. 9 because transistor 58 has little current flowing by the time CLOCK3 goes low as can be seen in FIG. 9. CLOCK2 then goes low shutting off transistor 54 and CLOCK1 goes high turning on transistor 78. As before, when transistor 52 is turned on node 62 is tristate and there is little charge required to equilibrate node 56 to VCC and hence little dI/dt is seen. CLOCK4 then goes low causing the gate of transistor 60 to be turned on. Transistor 74 is sized (small) to pull the gate of transistor 60 up slowly to reduce the dI/dt at time C in FIG. 9.

Figure 7:
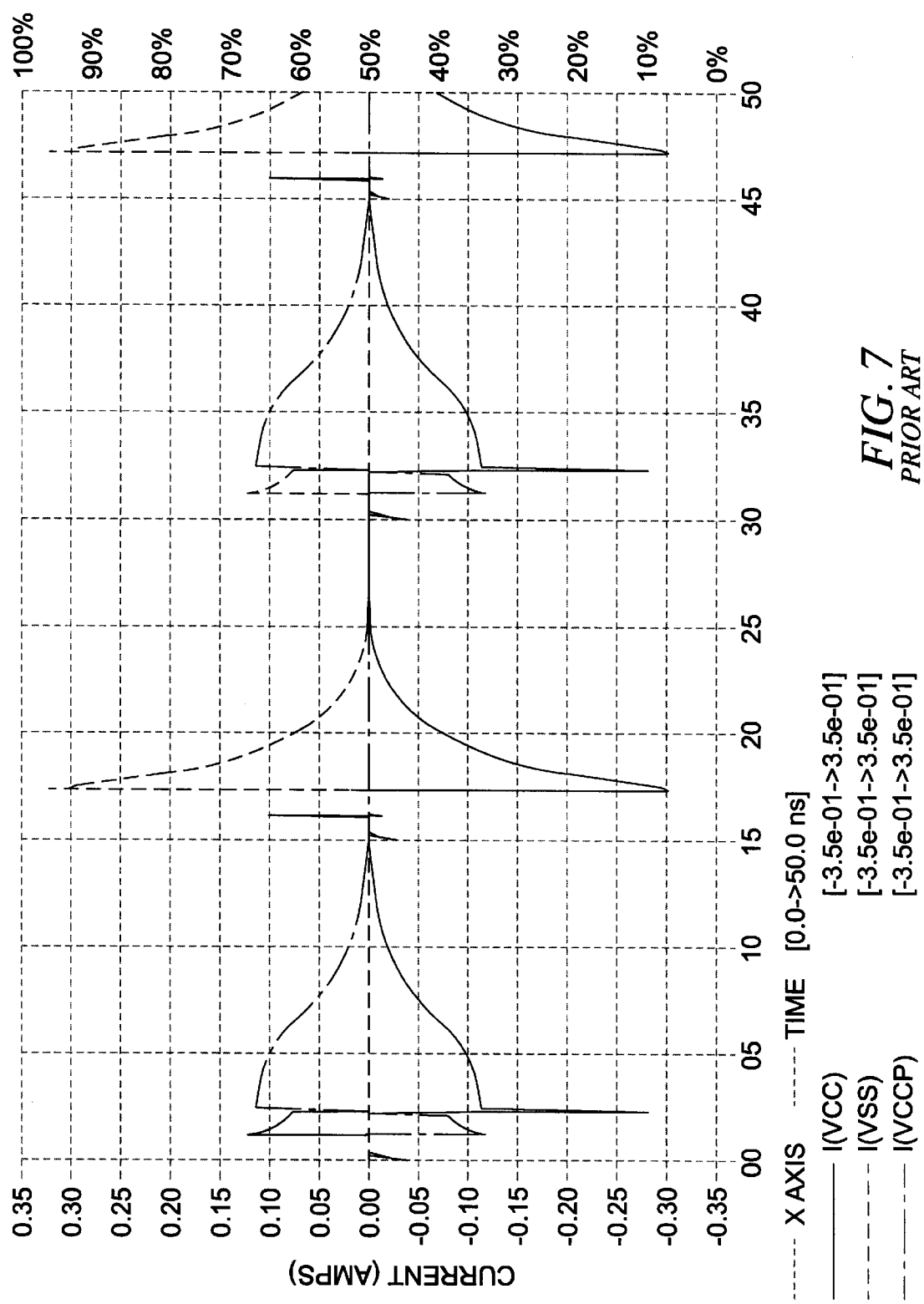
FIG. 7 is a timing diagram illustrative of the current flow on the VCC, VSS and VCCP sources for the conventional charge pump circuit shown in FIG. 1 and particularly pointing out the resultant current spikes generated by its operation as depicted in FIG. 4.

With reference additionally now to FIG. 7, in those applications wherein VCCP is required to provide relatively large amounts of current, the capacitor 26 and transistors 12, 14, 20 and 22 in the conventional charge pump circuit 10 of FIG. 1 must also be large in size. When the transistors switch "on" and "off" to drive the capacitor 26 nodes "high" or "low", large amounts of current flow and the rate of change of the current ("dI/dt") is also large. The voltage supplies VCC and VSS are sourcing and sinking this current so VCC and VSS voltage levels vary as a result of the charge pump operation. This voltage variation is "noise" and this noise on VSS and VCC can cause an IC device to fail to function properly in a system. The amount of noise is determined by the resistance and inductance of VCC and VSS and for IC devices, the most difficult source of noise to control is dI/dt because the die bond wires present significant levels of inductance.

In the conventional charge pump circuit 10, the pump capacitor is driven by the inverter 18 causing a relatively large change in current over time ("dI/dt") to occur when the capacitor node 24 is driven and when the transistor connecting the intermediate node 16 to the power supply is turned "on". A similar dI/dt also occurs when the transistor connecting the intermediate node 16 to the VCCP pumped node is turned "on". These rapid changes in current (dI/dt) result in undesired and sometimes unacceptable noise in the circuit as indicated by the slope of the current spikes shown in FIG. 7.

Figure 8:
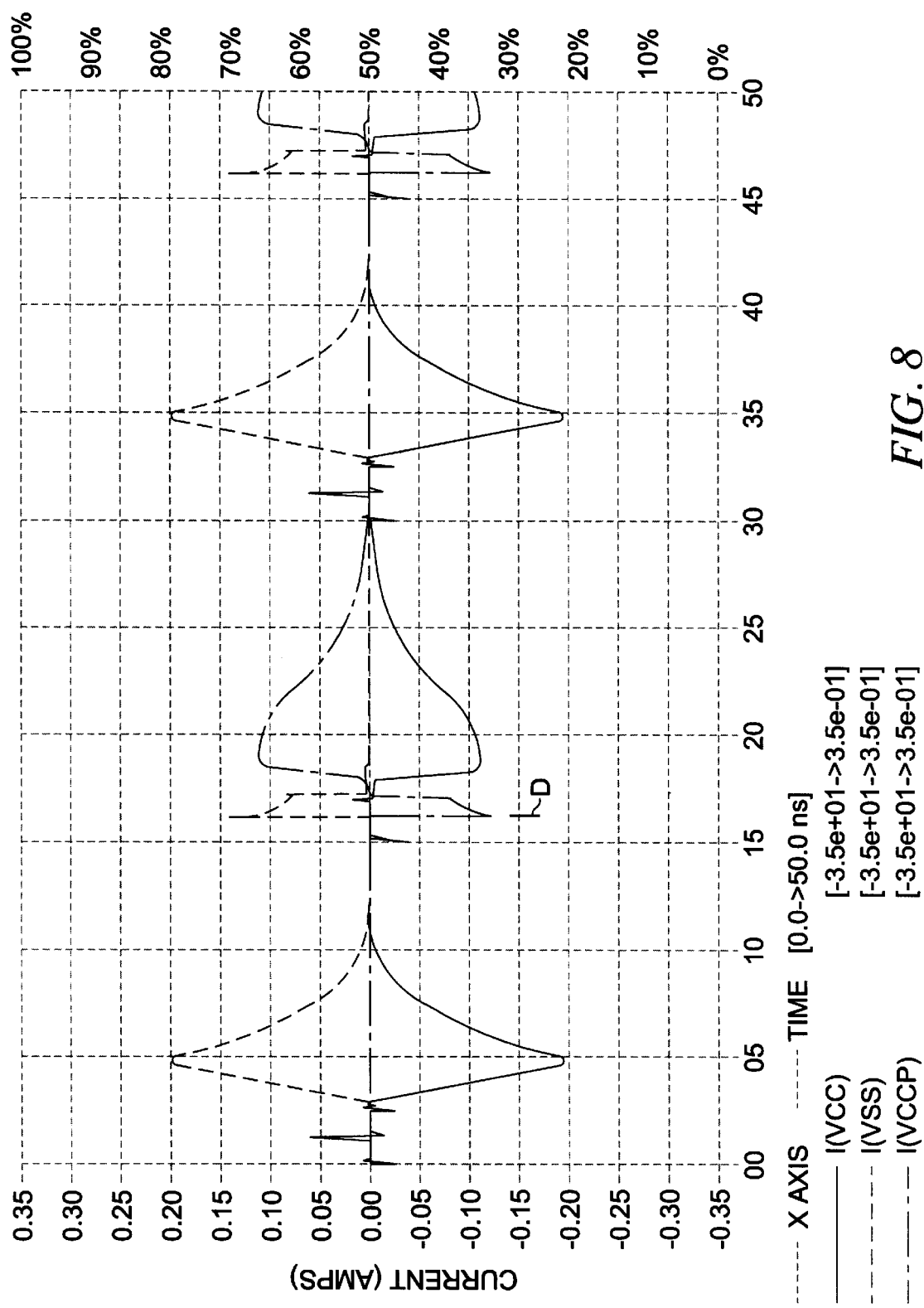
FIG. 8 is a timing diagram illustrative of the current flow on the VCC, VSS and VCCP sources for the "fast-off/slow-on" embodiment of the charge pump circuit shown in FIG. 2 and particularly pointing out the relative decrease in the slope (dI/dt) of the current spikes generated by its operation as depicted in FIG. 5.

With reference additionally now to FIG. 8, a timing diagram illustrative of the current flow on the VCC, VSS and VCCP sources for the "fast-off/slow-on" embodiment of the charge pump circuit depicted in FIG. 2 is shown. This figure shows clearly, in comparison to that of the preceding figure, that the dI/dt at 2.0, 17.0, 32.0 and 47.0 nanoseconds have been dramatically reduced.

With reference additionally now to FIG. 9 a similar timing diagram illustrative of the current flow on the VCC, VSS and VCCP sources for the alternative "tri-state" embodiment of the charge pump circuit depicted in FIG. 3 is shown. Note the absence of the current spike present at time D in FIG. 8. This is due to the "tristate" modification of FIG. 3. This diagram shows that there are but relatively small current spikes at 0.0, 1.0, 15.0, 16.0, 30.0, 31.0, 45.0 and 46.0 nanoseconds. These current spikes have a relatively high dI/dt but are also of very short duration such that they will not generate appreciable VCC or VSS noise.

The embodiments disclosed have been single stage type charge pumps. It is understood that these inventions could as easily be applied to charge pumps containing multiple stages. While there have been described above the principles of the present invention in conjunction with specific circuits and transistor technology, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. An integrated circuit device including a charge pump circuit comprising:
    a capacitive element having first and second terminals thereof coupled to an intermediate and capacitor nodes respectively;
    a first switching device for selectively coupling said intermediate node to a supply voltage line in response to a first clocking signal;
    a second switching device for selectively coupling said intermediate node to a pumped voltage line in response to a second clocking signal;
    a first inverter having an input coupled to receive a third clocking signal and an output coupled to a third switching device for selectively coupling said capacitor node to said supply voltage line in response to said third clocking signal; and
    a second inverter having an input coupled to receive said third clocking signal and an output coupled to a fourth switching device for selectively coupling said capacitor node to a ground voltage line in response to said third clocking signal.

2. The integrated circuit of claim 1 wherein said capacitive element comprises a capacitor having a capacitance of substantially 300 pf.

3. The integrated circuit of claim 1 wherein said first switching device comprises an N-channel MOS transistor.

4. The integrated circuit of claim 1 wherein said second switching device comprises an N-channel MOS transistor.

5. The integrated circuit of claim 1 wherein said third switching device comprises a P-channel MOS transistor.

6. The integrated circuit of claim 1 wherein said fourth switching device comprises an N-channel MOS transistor.

7. The integrated circuit of claim 1 wherein said first and second inverters comprise first and second CMOS inverters.

8. The integrated circuit of claim 7 wherein said first and second CMOS inverters comprise series connected P-channel and N-channel transistor pairs.

9. The integrated circuit of claim 8 wherein said P-channel transistor of said first CMOS inverter is larger than said P-channel transistor of said second CMOS inverter.

10. The integrated circuit of claim 8 wherein said N-channel transistor of said second CMOS inverter is larger than said N-channel transistor of said first CMOS inverter.

11. An integrated circuit device including a charge pump circuit comprising:
    a capacitive element having first and second terminals thereof coupled to an intermediate and capacitor nodes respectively;
    a first switching device for selectively coupling said intermediate node to a supply voltage line in response to a first clocking signal;
    a second switching device for selectively coupling said intermediate node to a pumped voltage line in response to a second clocking signal;
    a first inverter having an input coupled to receive a third clocking signal and an output coupled to a third switching device for selectively coupling said capacitor node to said supply voltage line in response to said third clocking signal; and
    a second inverter having an input coupled to receive a fourth clocking signal and an output coupled to a fourth switching device for selectively coupling said capacitor node to a ground voltage line in response to said fourth clocking signal.

12. The integrated circuit of claim 11 wherein said capacitive element comprises a capacitor having a capacitance of substantially 300 pf.

13. The integrated circuit of claim 11 wherein said first switching device comprises an N-channel MOS transistor.

14. The integrated circuit of claim 11 wherein said second switching device comprises an N-channel MOS transistor.

15. The integrated circuit of claim 11 wherein said third switching device comprises a P-channel MOS transistor.

16. The integrated circuit of claim 11 wherein said fourth switching device comprises an N-channel MOS transistor.

17. The integrated circuit of claim 11 wherein said first and second inverters comprise first and second CMOS inverters.

18. The integrated circuit of claim 17 wherein said first and second CMOS inverters comprise series connected P-channel and N-channel transistor pairs.

19. The integrated circuit of claim 18 wherein said P-channel transistor of said first CMOS inverter is larger than said P-channel transistor of said second CMOS inverter.

20. The integrated circuit of claim 18 wherein said N-channel transistor of said second CMOS inverter is larger than said N-channel transistor of said first CMOS inverter.

21. The integrated circuit of claim 11 wherein said third and fourth switching devices may be switched between states independently of each other in response to said third and fourth clocking signals respectively.

22. A method for operating a charge pump in an integrated circuit device comprising:

coupling a first terminal of a capacitive element to a supply voltage line while a second terminal of said capacitive element is coupled to a ground voltage line;

firstly decoupling said first terminal from said supply voltage line;

secondly decoupling said second terminal from said ground around line and coupling said second terminal to said supply voltage line;

thirdly coupling said first terminal to a pumped voltage line;

fourthly decoupling said first terminal from said pumped voltage line;

fifthly decoupling said second terminal from said supply voltage line and subsequently coupling said second terminal to a reference voltage line; and sixthly coupling said first terminal to said supply voltage line.

23. The method of claim 22 wherein said step of secondly decoupling said second terminal from said reference voltage line occurs relatively more quickly than said corresponding step of coupling said second terminal to said supply voltage line.

24. The method of claim 22 wherein said step of fifthly decoupling said second terminal from said supply voltage line occurs relatively more quickly than said corresponding step of coupling said second terminal to said reference voltage line.

* * * * *

UNITED STATES PATENT AND TRADEMARK OFFICE
CERTIFICATE OF CORRECTION

PATENT NO. : 6,518,829 B2
DATED : February 11, 2003
INVENTOR(S) : Douglas Blaine Butler It is certified that error appears in the above-identified patent and that said Letters Patent is hereby corrected as shown below:

<u>Column 9,</u>
Line 11, "around" should be -- voltage --

Signed and Sealed this

Twenty-fourth Day of June, 2003

JAMES E. ROGAN
*Director of the United States Patent and Trademark Office*